United States Patent [19]

Brissette et al.

[11] Patent Number: 4,542,996
[45] Date of Patent: * Sep. 24, 1985

[54] CENTER BEARING ASSEMBLY

[75] Inventors: Ronald N. Brissette; Richard L. Kumbier, both of Medina, Ohio

[73] Assignee: Rockwell International Corporation, Pittsburgh, Pa.

[*] Notice: The portion of the term of this patent subsequent to Aug. 7, 2001 has been disclaimed.

[21] Appl. No.: 685,580

[22] Filed: Dec. 24, 1984

Related U.S. Application Data

[63] Continuation of Ser. No. 492,766, May 9, 1983, abandoned.

[51] Int. Cl.[4] .............................................. F16C 27/06
[52] U.S. Cl. ..................................... 384/536; 384/222
[58] Field of Search ............................... 384/202–204, 384/215–218, 220–222, 443, 536, 535; 308/184 R

[56] References Cited

U.S. PATENT DOCUMENTS

| | | | |
|---|---|---|---|
| 2,135,902 | 11/1938 | Leister | 384/536 |
| 2,560,759 | 7/1951 | Evernden | 384/218 X |
| 2,580,119 | 12/1951 | Meyers | 384/222 |
| 2,893,790 | 7/1959 | Raes et al. | 384/536 |
| 2,897,023 | 7/1959 | Burkhalter | 384/536 |
| 3,140,901 | 7/1964 | Young | 384/536 |
| 3,639,015 | 2/1972 | Maas | 384/536 |
| 3,961,829 | 6/1976 | Bowen et al. | 384/536 |
| 4,392,694 | 7/1983 | Reynolds | 384/536 |
| 4,463,993 | 8/1984 | Brissette et al. | 384/536 |

Primary Examiner—Stuart S. Levy
Assistant Examiner—Thomas R. Hannon

[57] ABSTRACT

A unitary center bearing assembly for rotatably mounting a vehicle drive shaft which includes a resilient support having an aperture therethrough, an anti-friction bearing seated in the aperture and a generally U-shaped mounting bracket having a plurality of tabs and at least one detent extending inward and securing the resilient support against movement relative to the bracket.

3 Claims, 4 Drawing Figures

CENTER BEARING ASSEMBLY

This application is a continuation of application Ser. No. 492,766, filed 5/9/83, now abandoned.

BACKGROUND OF THE INVENTION

This invention relates to a bearing for rotatably mounting a shaft and, more particularly, a bearing of the type frequently referred to as a center bearing or midship bearing utilized to support a vehicle drive shaft or propeller shaft from a member secured to the frame of a vehicle.

In conventional rear wheel drive vehicles a drive shaft extends at an inclination from the transmission to the differential and is connected by universal joints at its opposite ends to the transmission shaft and to the input pinion of the differential. Due to the greater length of larger vehicles such as trucks and buses, the propeller or drive shaft is provided in sections at least one of which extends rearwardly from the transmission, generally parallel to the frame of the vehicle, and is rotatably supported by means of a bearing fixed to a bracket or cross tube secured to the vehicle frame. That section is connected by means of a universal joint to an inclined section of the drive shaft which in turn is connected to the input pinion of a differential.

DESCRIPTION OF THE PRIOR ART

Several center bearing assemblies and resilient mounting arrangements are shown in U.S. Pat. Nos. 2,135,902; 2,560,759, 2,893,790; 2,897,023; 3,140,901; 3,639,015 and 3,961,829. These patents disclose bearing assemblies for rotatably mounting a shaft or a tube by means of a anti-friction bearing supported internally of a resilient support carried by a bracket which may be secured to the vehicle frame. However, none of these patents disclose a relatively simple economical means or method of securing the resilient support and bearing within the bracket as a unitary assembly for convenience and ease of handling during storage and installation.

SUMMARY OF THE INVENTION

The invention is a rotary bearing for a vehicle drive shaft including a bracket having an inner surface of substantial axial width extending partly around the drive shaft and a pair of spaced legs, each leg terminating in means for securing the bracket to a fixed support, a resilient support having an aperture extending axially therethrough and an outer peripheral surface substantially complimentary to and in abutment with the periphery of the inner surface of the bracket. An anti-friction bearing is seated in the resilient support aperture. Means are provided to prevent axial movement of the resilient support relative to the bracket and an element extending inward from at least one leg of the bracket engages the resilient support to secure the resilient support against withdrawal from the between the bracket legs.

In the preferred embodiment a portion of each bracket leg is formed as a detent projecting inward to engage the resilient support and a pair of notches are provided in the outer peripheral surface of the resilient support to receive the detents and thereby secure the support within the bracket.

In the preferred embodiment, a plurality of tabs are also die cut and bent radially inward from the bracket on each side of the resilient support to prevent axial movement of the support relative to the bracket.

The advantages offered by the present invention will become apparent from the following description of the embodiment shown in the accompanying drawings:

DESCRIPTION OF THE DRAWINGS

In the drawings, wherein like reference numerals refer to like parts.

DESCRIPTION OF THE PREFERRED EMBODIMENT

Figure 1:
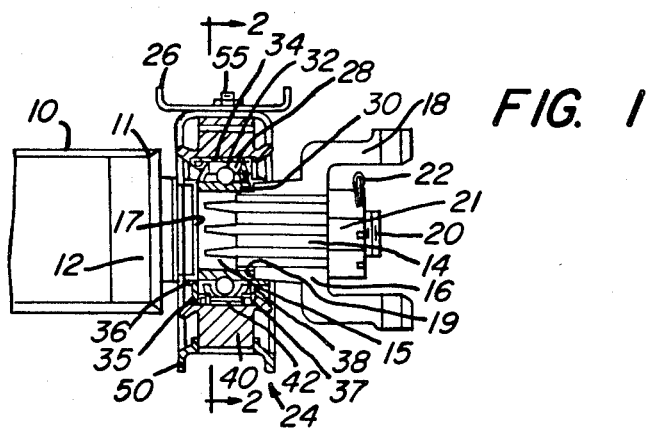
FIG. 1 is a sectional view of a side elevation of a rotary bearing support for a vehicle drive shaft.

With reference to the drawings, FIG. 1 shows a section of a vehicle drive shaft comprised of a tube 10 jointed by means of a weld 11 to a stub shaft 12. The stub shaft 12 is splined at 14 to receive the internally splined end 16 of a yoke 18. The end 20 of the stub shaft is reduced in diameter and threaded to receive a castellated lock nut 21 which together with a cottor key 22 secures the yoke 18 on the stub shaft 12. A prevailing torque nut or a bolt engaged with a threaded internal bore in the stub shaft may be used instead of the lock nut 21 and cotter key to secure the yoke to the stub shaft.

The tube 10 extends from a suitable universal coupling (not shown) usually at and driven by the vehicle transmission. The yoke 18 is one of a pair of yokes connected by means of a cross member and bearings, not shown, to another section of the vehicle drive shaft which would be connected at its other end by means of a suitable universal coupling to the input pinion of a differential mechanism carried by a drive axle housing.

The stub shaft 12 is rotatably supported by a center bearing assembly generally designated by the reference numeral 24. The center bearing assembly consists of a anti-friction bearing 28 mounted in a resilient support 40 which in turn is carried by a stamped metal bracket 50.

The anti-friction bearing 28 is a ball type roller bearing having an inner race 30, an outer race 32 and a sleeve or casing 34. The inner race 30 is press fit upon a bearing seat 15 provided inwardly of the splined portion of stub shaft 12 where it is secured between the radial inner surface 19 at the inner end of yoke 18 and the shoulder 17 of stub shaft 12 for rotation with the stub shaft 12.

The bearing is secured within a stamped metal casing 34 having a pair of axially spaced, radially inwardly extending sidewalls 35 and 37 terminating in axially extending lip portions 36 and 38 respectively. The lip portions 36 and 38 are dimensioned to fit closely adjacent the stub shaft shoulder 17 and the splined end 16 of the yoke 18 to protect the bearing from dust and dirt.

The casing 34 of anti-friction bearing 28 is seated in an opening or aperture 42 extending axially through a resilient rubber support block 40. The resilient support block 40 is also provided with a plurality of annular slots 43 having staggered connecting webs cored into the support block fron each side and providing a relatively thin wall between the two rows of slots 43. The slots 43 with the staggered webs and the thin wall between the slots provide an added degree of flexibility to the resilient rubber support.

Figure 2:
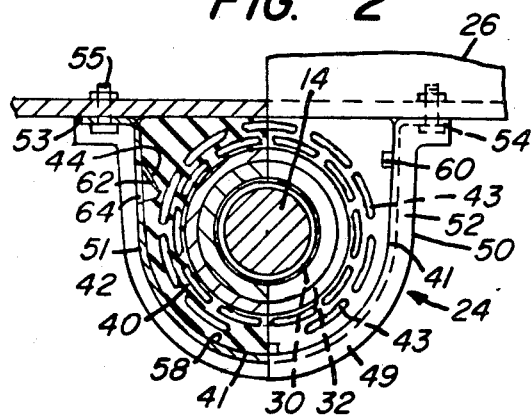
FIG. 2 is a front view of the same, viewed partly from a transverse section through the shaft in advance of the bearing support and partly along line 2—2 of FIG. 1.
Figure 3:
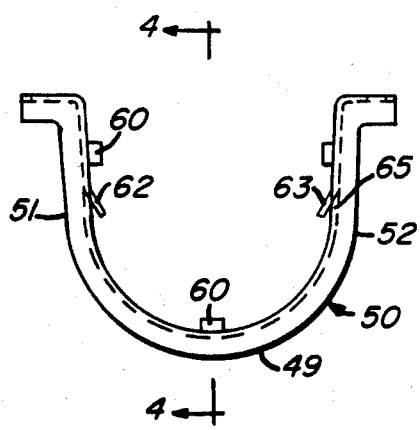
FIG. 3 is a front view of the bracket of the rotary bearing assembly.

The resilient rubber support 40 is secured to the underside of the vehicle by means of a generally U-shaped, stamped metal bracket 50. With reference to FIGS. 2 and 3, the bracket 50 is formed with a semi-circular center portion 49 extending partly around the stub shaft 12 and having a pair of spaced legs 51, 52 respectively terminating in a flange or ear 53, 54, each having an aperture providing means by which the bracket 50 may be secured through the use of nut and bolt assemblies 55 to a fixed support such as a crossover tube 26 supported by the vehicle frame.

The bracket 50 is a stamped metal part having an inner surface 58 of substantial axial width, i.e, the dimension measured parallel to the axis of the stub shaft 12. The periphery of surface 58 is formed complimentary to the outer peripheral surface 41 of the resilient support 40 so the resilient support 40 may be received with its outer periphery in abutment with the inner surface 58 of the bracket 50.

Figure 4:
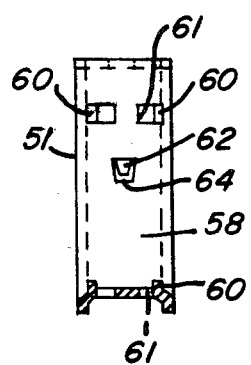
FIG. 4 is a view taken partly in section along the line 4—4 of FIG. 3.

Certain portions of the bracket 50 are die cut and bent to extend radially inwardly from the surface 58 to provide a plurality of tabs 60 and detents 62. As best shown by FIG. 4, two parallel rows of tabs 60 are die cut and folded inwardly from the bracket 50, leaving apertures 61 in the surface 58. The rows of tabs are axially spaced so that each row abuts one of the opposite surfaces of the resilient support 40 to prevent axial movement of the resilient support 40 relative to the bracket 50.

A pair of detents 62 and 63 are also die cut and bent to extend inwardly at an angle from the legs 51 and 52 of bracket 50, leaving a pair of apertures 64 and 65 in the surface 58. The detents 62 and 63 are preferably located so as to be positioned opposite a pair of notches 44, only one of which is shown, formed in the outer periphery 41 of the resilient support 40 when the support 40 is assembled to the bracket 50 to thereby engage the resilient support and secure it against withdrawal from between the bracket legs 51 and 52 in a direction substantially normal to the axis of the resilient support opening 42.

Thus, after the anti-friction bearing 28 has been seated in the resilient support aperture 42, the resilient support 40 is inserted between the parallel rows of tabs 60 into the bracket 50 until the detents 62 and 63 engage the notches 44 provided to the resilient support. The component parts are thus assembled as an integral unit, the tabs 60 preventing axial movement of the resilient support 40 relative to the bracket 50 and the detents 62 preventing withdrawal of the resilient support 40 from between the bracket legs 51 and 52.

The invention may also be embodied in other specific forms without departing from the spirit or essential characteristics thereof. For example, one may chose to use only a single detent and notch 44 to secure the resilient support against withdrawal in a radial direction from the bracket 50. One may also elect to use either one or a pair of elements such as the detents 62 to extend inward from the inner surface 58 of the bracket 50 and engage or penetrate the resilient peripheral surface 41 of the resilient support 40 without providing notches or other means in the resilient support to receive such elements.

The tabs and detents thus provide a relatively simple and economical means and method of assembly to secure the resilient support and bearing within the bracket to form an integral or unitary center bearing assembly without the use of additional elements to secure the component parts together. A unitary center bearing assembly is more convenient and easier to handle during storage and installation.

The foregoing description is therefore to be considered as illustrative and not restrictive, the scope of the invention being defined by the appended claims and all changes which come within the meaning and range of equivalence of the claims are therefore intended to be embraced thereby.

What is claimed and desired to be secured by Letters Patent is:

1. A rotary bearing for a vehicle drive shaft comprising a bracket extending partly around said shaft and having a pair of spaced legs with each said leg terminating in means for securing said bracket to a fixed support, said bracket having an inner surface of substantial axial width;
    a resilient block having an aperture extending axially therethrough and an outer peripheral surface substantially complimentary to and in abutment with the periphery of said inner surface;
    at least one notch in said outer peripheral surface opposite one leg of said bracket;
    an anti-friction bearing seated in said resilient block aperture;
    means preventing axial movement of said resilient block relative to said bracket; and
    an element extending inward from said one leg of said bracket and received within said notch to secure said resilient block between said bracket legs independently of other elements.

2. The rotary bearing defined by claim 1 wherein said element comprises a detent extending inward from said inner surface of said bracket.

3. A center bearing for a vehicle drive shaft comprising a U-shaped bracket having a portion extending partly around said shaft and terminating in a pair of spaced legs with each leg terminating in means for securing said bracket to a fixed support, said bracket having an inner surface of substantial axial width;
    a resilient block having an aperture extending axially therethrough and an outer peripheral surface substantially complimentary to and in abutment with the periphery of said inner surface;
    an anti-friction bearing having an outer race seated in said resilient block aperture;
    means preventing axial movement of said resilient block relative to said bracket;
    a notch on each side of said resilient block opposite said bracket legs; and
    a detent extending inwardly from each leg, each said detent received within one of said notches to secure said resilient block between said bracket legs independently of other elements.

* * * * *